United States Patent [19]

Smith

[11] Patent Number: 5,009,571

[45] Date of Patent: Apr. 23, 1991

[54] WIND MOTOR

[75] Inventor: Raoul D. Smith, Lompoc, Calif.

[73] Assignee: Aeolian Partnership, Camarillo, Calif.

[21] Appl. No.: 460,832

[22] PCT Filed: Jan. 26, 1989

[86] PCT No.: PCT/US89/00326

§ 371 Date: Dec. 28, 1989

§ 102(e) Date: Dec. 28, 1989

[51] Int. Cl.$^5$ ............................................. F03D 5/06
[52] U.S. Cl. ........................................ 416/79; 416/83
[58] Field of Search .................. 416/9, 11, 17, 18, 79, 416/80, 82, 83, 119; 415/2.1, 4.1, 4.2, 4.4, 905, 907; 74/42; 290/44, 55

[56] References Cited

U.S. PATENT DOCUMENTS

| 827,889 | 8/1906 | Smith | 416/80 |
| 961,705 | 6/1910 | Matthews | 416/80 X |
| 1,302,889 | 5/1919 | Albisû | 416/83 |
| 1,479,216 | 1/1924 | Bott | 416/83 |
| 2,151,172 | 3/1939 | Villarreal | 416/9 |
| 2,465,285 | 3/1949 | Schwickerath | 416/9 X |
| 4,486,145 | 12/1984 | Eldredge et al. | 416/82 |
| 4,525,122 | 6/1985 | Krnac | 416/82 X |

FOREIGN PATENT DOCUMENTS

| 314034 | 7/1920 | Fed. Rep. of Germany | 416/80 |
| 2144889 | 3/1973 | Fed. Rep. of Germany | 416/83 |
| 526804 | 10/1921 | France | 416/80 |
| 1280528 | 11/1961 | France | 416/81 |

Primary Examiner—Edward K. Look
Assistant Examiner—James A. Larson
Attorney, Agent, or Firm—Daniel C. McKown

[57] ABSTRACT

A machine for extracting useful work from lowspeed winds includes a sail (28) pivotally mounted to an arm (22) for pivotal motion about a first axis (32), and a base (18) to which the arm (22) is pivotally mounted for pivotal motion about a second axis (24) that is parallel to the first axis (32). Through the use of a parallelogram linkage (38, 40, 52, 54), the angle $\alpha$ of the sail with respect to the base is rendered independent of the angle $\theta$ of the arm with respect to the base. This permits the angle of attack of the sail (28) to be programmed to provide any desired motion of the arm (22) with respect to the base. In a preferred embodiment, the angle $\alpha$ of the sail with respect to the base is coupled to the angle $\theta$ of the arm with respect to the base in quadrature so that the maximum angle of attack of the sail occurs in the middle of the stroke of the arm and so that the angle of attack of the sail is reduced to zero as the arm approaches the limits of its range of motion. In this way, the arm oscillates back and forth and is coupled by a connecting rod (46) to a crankshaft (44) for turning a generator (68).

13 Claims, 4 Drawing Sheets

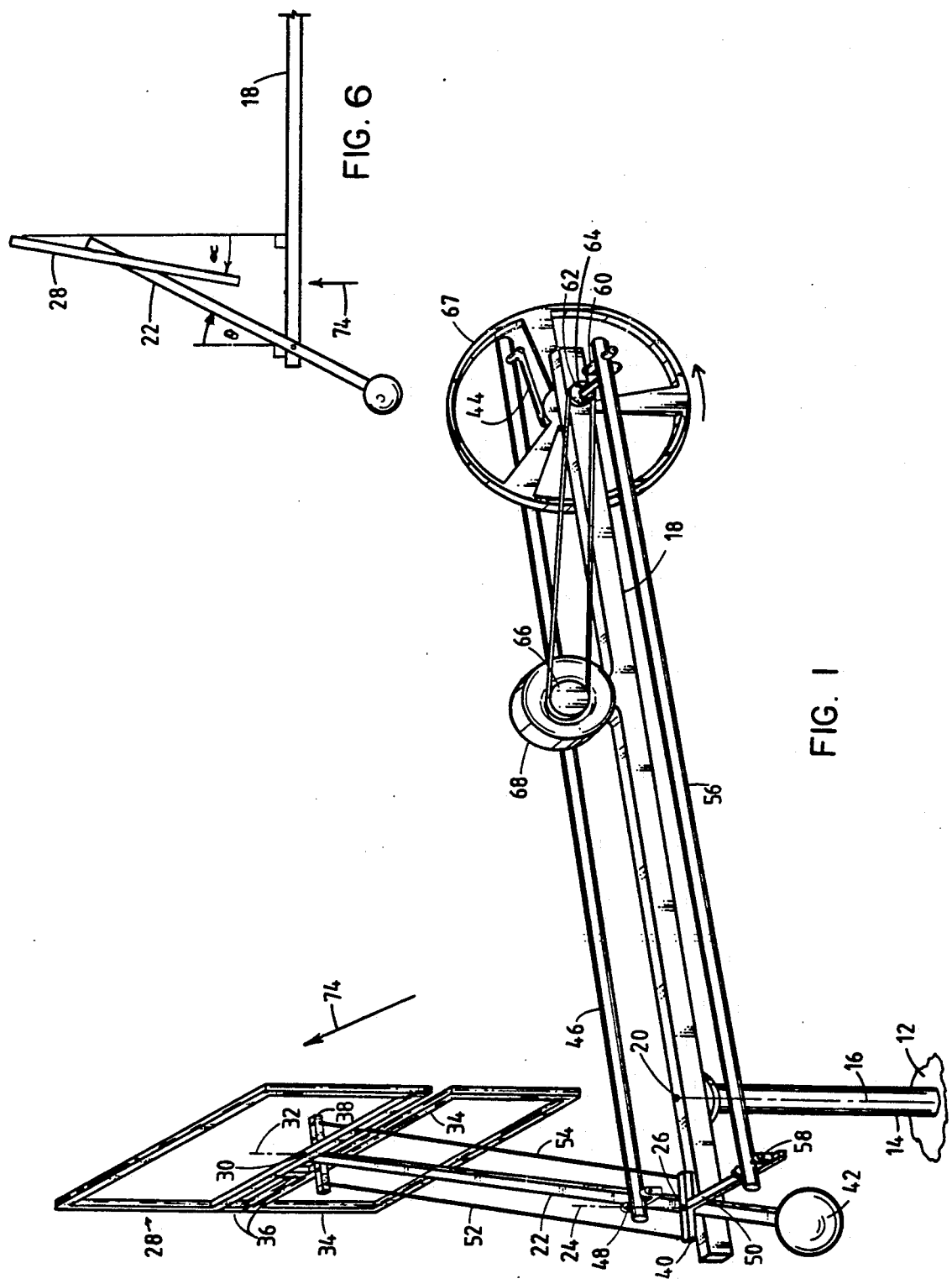

WIND MOTOR

TECHNICAL FIELD

The present invention is in the field of wind motors and more particularly relates to a wind motor not requiring high wind speeds, and in which the prime mover is a sail whose angle of attack is continuously altered to produce a reciprocating motion of an arm on which the sail is mounted.

BACKGROUND ART

Geographically, there are relatively few locations where a steady high wind prevails. Instead, there are many more locations that enjoy a dependable low-speed wind. The prior art reflects numerous attempts by inventors to harness this bountiful energy resource.

In general, it is true that the design of a wind motor is based on and reflects the range of wind speeds at which it is intended to operate. Wind motors designed for use at high wind speeds typically employ propellers, and either do not work at all or are grossly inefficient at low wind speeds. On the other hand, machines designed for use at low wind speeds typically employ large sheet-like airfoils or sails, which are susceptible to damage at high wind speeds, and therefore have to be shut down when high winds are blowing.

A wind motor designed for use at low wind speeds must have a long maintenance-free life. Because the output power is relatively small, a long amortization time is implied. Accordingly, the wind motor must be designed to withstand exposure to the elements, and should be constructed of readily available parts. Also, a low-speed wind motor should be capable of unattended operation.

The prior art relating to low-speed wind motors appears to fall into several well-defined categories.

One category includes wind motors in which a number of sails are mounted for rotation on arms which rotate about an axis. U.S. Pat. No. 2,603,300 to King exemplifies this category, which includes in addition: U.S. Pat. No. 2,406,268 of Terhune; U.S. Pat. No. 1,964,347 of Ford; U.S. Pat. No. 1,577,096 of Aust, U.S. Pat. No. 1,321,415 of Brown; and U.S. Pat. No. 1,154,930 of Might.

Closely related to the first category of patents are a group of patents relating to aircraft propellers, exemplified by U.S. Pat. No. 2,045,233 of Kirsten, et al. In these patents, a number of airfoil blades are rotatably mounted to a wheel, with the individual axes of rotation parallel to the axis of rotation of the wheel. Other patents showing such propellers are: U.S. Pat. No. 1,636,423 of Langenbauch; U.S. Pat. No. 1,591,977 of Horne; and, U.S. Pat. No. 1,432,700 of Kirsten.

The most pertinent prior art is believed to be found in a category in which one or more sails are mounted on an oscillating arm. These patents will now be discussed at somewhat greater length.

In U.S. Pat. No. 4,595,336, Grose shows a wind motor in which an elongated boom is centrally pivoted for rocking movement in a vertical plane. Wings are mounted to the upwind and downwind ends of the elongated boom, and each wing includes a control tab or panel extending along its downstream edge. The control panels are movable with respect to the wings and influence the angle of attack of the wings. The positions of the control panels are altered by the snap action of a toggle as the rocking boom approaches the limit of its oscillating motion, thereby causing the arm to pivot in the opposite sense. There is no provision for altering the angle of the control panels in relation to the angle of the boom. Instead, the control panel is in either its maximum up position or in its maximum down position as determined by the toggle.

In U.S. Pat. No. 237,851, Foskett shows an elongated arm centrally pivoted for rocking movement in a vertical plane. At one end of the arm is a rudder which causes the arm to point into the wind. On the opposite end of the arm is mounted a frame in which a number of slats or vanes are pivotally mounted about parallel spaced horizontal axes. The angle of these vanes is abruptly altered at the end of each stroke by mechanical stops, in a first embodiment. In another embodiment, the angle is altered by an overcenter weight.

In U.S. Pat. No. 827,889, Smith shows a current motor having an arm pivoted about a vertical axis and a blade mounted to the arm for pivotal motion about a different vertical axis. The center of pressure of the blade must be upstream of the axis about which the blade pivots, so that the pressure of the flowing liquid will hold the blade in one or the other of its two extreme positions. The extreme positions are determined by a chain or cable whose effective length varies throughout the stroke in a determinable manner. There is no provision for rendering the device current-seeking.

In U.S. Pat. No. 317,756, Flint shows an elongated arm mounted for rotation in a horizontal plane, and having two vanes mounted in a plane and pivotally attached to the downstream end of the arm for pivotal motion about a vertical axis. Although the vanes are described as "hanging free and independent," the arm is said to oscillate in the horizontal plane. In operation, the vanes are described as altering between two extreme positions.

Thus, although a number of approaches have been tried to extract energy from low-speed winds, it appears that the inventions which employ oscillating arms also employ abrupt alteration of the angle of the sails at the end of each stroke. This abrupt change necessarily puts stress on certain elements of the device, and ultimately shortens its life.

As will be seen below, the apparatus of the present invention delivers its power in a smooth and controlled manner, thereby prolonging the life of the device.

SUMMARY OF THE INVENTION

It is an objective of the present invention to provide a wind motor usable with low-speed winds. This is accomplished through the use of one or more sails that are mounted to the motor for pivotal motion about an axis passing through the center of pressure of the sail. This permits the sail to be turned to various angles without having to overcome the torques that otherwise would be present if the center of pressure were located off the axis about which the sail is pivoted.

Another objective is to provide a wind motor that can withstand occasional high winds by automatically altering its configuration. Specifically, a governor is used to reduce the angle of all the sails simultaneously as the wind speed increases. This results in a reduction of the forces exerted by the wind on the sails and other structural components of the motor. In this way, the wind motor of the present invention adapts itself to changes in the windspeed.

Another objective of the present invention is to provide a wind-seeking wind motor which continuously positions itself to a desired orientation with respect to the wind direction. In this way, the wind motor of the present invention adapts itself to changes in the wind direction. This is accomplished by mounting the sails and their related structures to a base that is mounted for rotation to a foundation fixed to the earth, with the center of pressure of the sails and related components located downstream from the axis of rotation.

A further objective of the present invention is to provide a wind motor in which there are no abrupt changes in the motion of the parts. This greatly reduces the stresses imposed on the structural elements of the motor.

In a preferred embodiment of the present invention, the angle of each sail is altered in quadrature to the angle of the arm on which the sail is mounted. The lateral motion of the arm is approximately sinusoidal (in a steady wind), and the angle of each sail is altered in relation to the lateral position of the arm. The maximum sail angle occurs when the arm is at its center position and the sail angle is zero when the arm is at either of its extreme positions. The sail angle varies in an approximately sinusoidal manner, but is 90 degrees out of phase with the motion of the arm. This 90 degree relationship is usually referred to as quadrature. If the instantaneous sail angle is $$\alpha = \alpha_{max} \sin \chi$$

where $\chi$ is any continuously increasing phase variable, such as time or the rotational position of a flywheel, and if $$\theta = \theta_{max} \cos \chi$$

then $$\left(\frac{\alpha}{\alpha_{MAX}}\right)^2 + \left(\frac{\theta}{\theta_{MAX}}\right)^2 = 1$$

This equation characterizes the quadrature relationship.

The present inventor recognized that by imposing this quadrature relationship the sail arm can be made to reverse direction in a gradual manner, rather than abruptly as in certain prior art devices. An abrupt change of direction imposes greater stresses on the structure and results in a mechanical shock or impulse that jerks the entire structure. These unfavorable effects are avoided by the approach taken in the present invention.

Another objective of the present invention is to provide a wind motor that turns an output shaft which cannot become stalled at a top dead center position. In accordance with the present invention, this is accomplished by providing two sails connected to a drive shaft in quadrature, so that when one of the sails is supplying minimal power, the other sail is supplying maximum power, thereby eliminating the possibility that the motor might stall at a position from which it could not be restarted.

It is a further objective of the present invention to provide a wind motor having more than one sail and in which the motions of the sails are interrelated in such a way that the structure remains balanced at all times. This is accomplished by mechanically interconnecting the sails in such a way that their motions are mirror images of each other.

Finally, it is an objective of the present invention to provide a wind motor capable of reliable unattended operation. This objective is accomplished by eliminating the possibility of a stalled condition, and by designing the motor to reduce stresses on the components and to eliminate abrupt changes in the direction of the sails.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of an illustrative embodiment showing a single sail and its mounting;

BEST MODE FOR CARRYING OUT THE INVENTION

Figure 3:
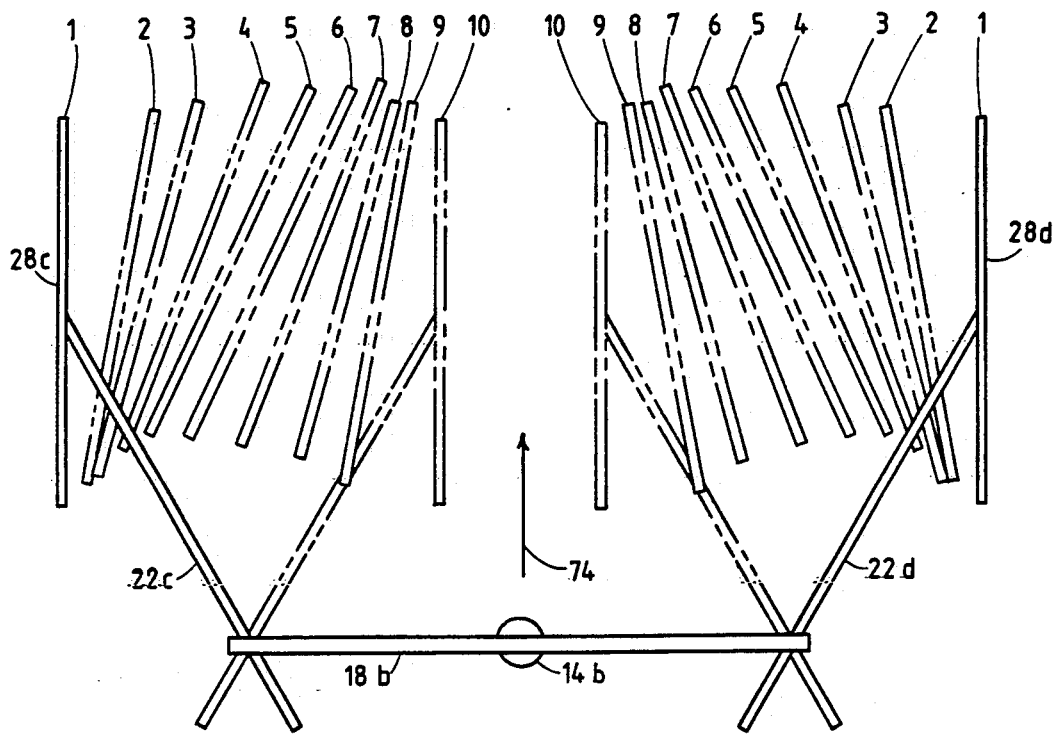
FIG. 3 is a diagram showing in a top plan view the positions of the two sails and their support arms at successive times of one-half cycle of operation.

Turning now to the drawings, in which like parts are denoted by the same reference numeral throughout, there is shown in FIG. 1 a simplified illustrative embodiment of the invention. In this embodiment, a foundation 12 that extends into the ground supports a column 14 that is coaxial with a vertical axis 16. The remaining structure in FIG. 1 is affixed to the top of the column 14 and is balanced so that its center of gravity lies on the axis 16. In this simplified embodiment, the base 18 is not rotatable about the axis 16 and the wind is assumed to be blowing perpendicular to the base 18.

An arm 22 extends from the sail assembly 28 to the counterweight 42 and is pivotally connected to the base 18 by means of the pin 26 for rotation about a vertical axis 24. This ability of the arm 22 to pivot permits it to reciprocate through an angular interval as driven by the sail assembly 28 to provide a useful output of power. To that end, an oar lock 48 is attached to the arm 22, and a connecting rod 46 transmits the force of the arm 22 to the crank 44. In this manner, as the arm 22 moves back and forth, it turns the crank 44, from which power can be taken. As will be seen below, the arm 22 is moved forcefully back and forth about the axis 24 by the interaction of the wind with the sail assembly 28.

The sail assembly 28 is attached to the arm 22 near the end of that arm for pivotal motion about the pin 30 which defines the sail pivot axis 32. It should be noted that the upper and lower portions of the sail are rigidly connected by the interconnections 36, so that the upper and lower portions pivot as a unit. The pin 30 is located with respect to the sail assembly 28 in such a way that the axis 32 passes through the center of pressure of the sail, so as to minimize or eliminate any tendency of the wind to exert a torque on the sail about the axis 32.

The sail control arm 38 is rigidly attached to the sail assembly 28 and extends perpendicular to the plane defined by the frame members 34. Thus, the sail control arm 38 pivots in unison with the sail assembly about the axis 32.

The T-shaped member 40 is also carried on the pin 26 for rotation about the vertical axis 24. The T-shaped member 40 is not otherwise connected to the arm 22 or to the base 18, and can rotate about the axis 24 with respect to those other members. The ends of the sail control arm 38 are connected to the ends of the T-shaped member 40 by the cables 52, 54. The cables 52, 54 are of equal length, and the length of the sail control arm 38 is the same as that of the T-shaped member 40, so that those elements form a parallelogram when viewed in the horizontal plane. Thus, it will be seen that the angle of the sail assembly 28, with respect to the base 18, is the same as the angle of the arm 50 with respect to the base 18.

FIG. 6 shows the embodiment of FIG. 1 in a top plan view and defines certain angles that will be referred to below.

The angle $\alpha$ indicates the orientation of the sail assembly 28 with respect to the base 18, and, independently, the angle $\theta$ indicates the orientation of the arm 22 with respect to the base 18. By measuring $\alpha$ and $\theta$ from a direction corresponding to the wind direction (74 of FIG. 6), which is perpendicular to the direction of elongation of the base 18, $\alpha$ and $\theta$ become analogous, respectively, to the angle of attack and the pitch angle conventionally employed in aerodynamics.

It is basic to an understanding of the invention to appreciate that for any angle $\theta$ of the arm 22 with respect to the base 18, the angle $\alpha$ of the sail with respect to the base 18 is determined solely by the angle of the arm 50 with respect to the base 18. That is, at any angle $\theta$, it is possible to pivot the sail to any desired angle $\alpha$ with respect to the base 18 simply by rotating the arm 50.

The greatest contribution of the present inventor was in recognizing that the angle $\alpha$ of the sail, for any position of the arm 22, is determined by the angle of the arm 50 with respect to the base 18. The present inventor also recognized that if the angle $\alpha$ were to be programmed so as to be in quadrature with the angle $\theta$ between the arm 22 and the base 18, then the arm 22 could be made to move smoothly back and forth between the angular extremes $+\theta_{max}$ and $-\theta_{max}$. The angle $\alpha$ equals zero at both of these extremes, thereby causing the arm 22 to reverse direction in a gradual manner as described above. The angle $\alpha$ varies between the angular extremes $+\alpha_{max}$ and $-\alpha_{max}$, which occur when $\theta=0$ and the arm 22 is moving, respectively, counter-clockwise and clockwise as viewed in FIG. 6, thereby providing maximum torque at the center of the stroke of the oar 46. The present inventor implemented this idea by connecting the arm 50 to the crank 60 by means of the connecting rod 56, which is attached to the arm 50 by the oar lock 58. As seen in FIG. 1, the crank 60 is 90 degrees out of phase with respect to the crank 44. These cranks are on a common shaft 64, and movement of this shaft is in a counterclockwise rotation for the phase relationship shown between cranks 44 and 60.

In the illustrative embodiment of FIG. 1, useful work is done by the apparatus. A pulley 62 that rotates with the crankshaft 64 turns a pulley 66 that is mounted on the shaft of a generator 68 that is attached to the base 18. The flywheel 67 helps the device to avoid stalling in a top dead center position.

It will be recognized that the apparatus of FIG. 1 would function as described above if the entire apparatus were rotated 90 degrees to render the base 18 vertical.

Although in the illustrative embodiment of FIG. 1 the angle $\alpha$ of the sail, which is determined by the position of the arm 50 relative to the base 18, is programmed by connecting the arm 50 to the crank 60 through the connecting rod 56, the present inventor recognized that more sophisticated programs can be executed. For example, the position of the arm 50 with respect to the base 18 can be altered by an actuator connected between the arm and the base, and the actuator can be controlled by a control circuit that is responsive to other variables which may or may not include the angle between the arm 22 and the base 18. One such additional variable could be the rate of change of the angle between the arm 22 and the base 18. This variable could be used to account for the fact that the sideward movement of the sail assembly 28 alters the direction of the wind flow with respect to the sail, even though the wind is assumed to be blowing steadily perpendicular to the base 18.

It is also possible to advance the phase of the angle $\alpha$ to compensate partially for the inertia of the arm 22 about the axis 24.

Another possibility for programming the position of the arm 50 with respect to the base 18 involves setting up wind velocity and direction sensors at stations positioned a short distance away from the apparatus in FIG. 1. From these stations, the direction and velocity of the wind at the sail assembly can be predicted a few seconds in advance. This advance knowledge of the wind velocity and direction would permit the direction of the arm 50 with respect to the base 18 to be altered to take best advantage of the expected wind. For example, the angle of attack might be decreased in anticipation of stronger wind to prevent overloading, and might be increased in anticipation of lower wind speed to prevent the sail from stalling. In this manner, the efficiency of the apparatus can be improved.

Figure 2:
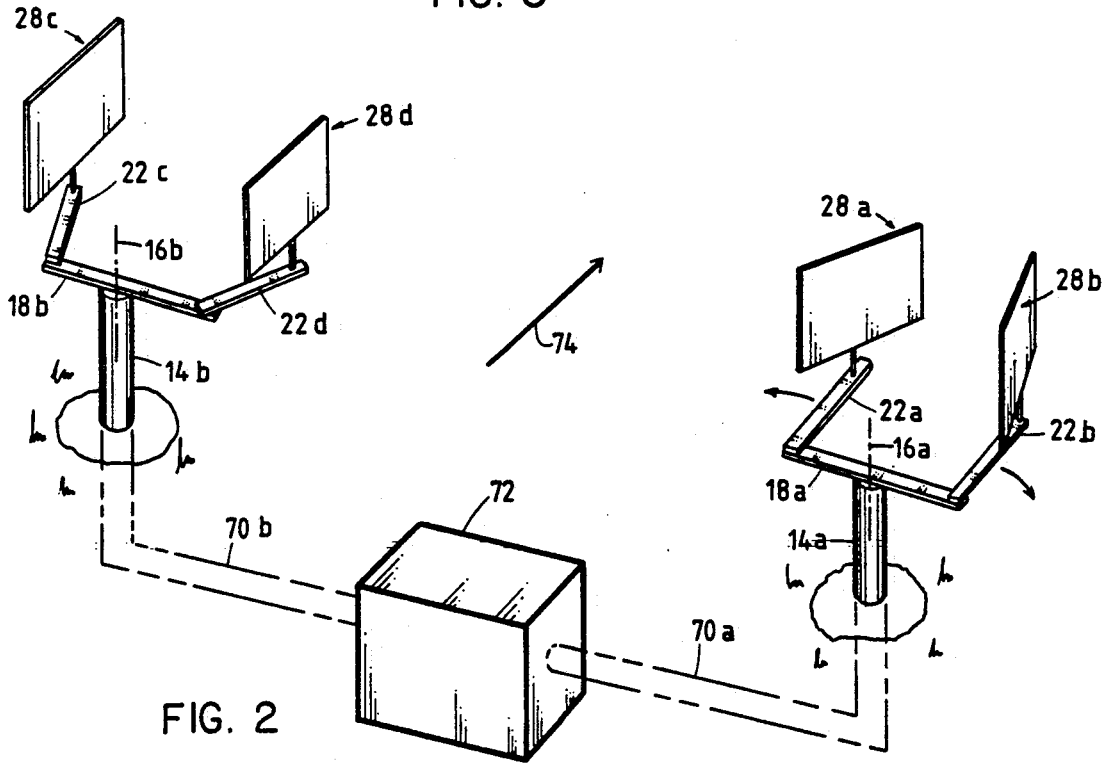
FIG. 2 is a diagram showing in perspective the arrangement of two masts connected to a central station.

FIG. 2 is a diagram showing the major components of a preferred embodiment of the present invention. In that embodiment the sails 28a and 28b move in opposition relative to the common base 18a, and the sails 28c and 28d move in opposition relative to the common base 18b.

The term "opposition" refers to a phase difference of 180 degrees, and is to be distinguished from the term "quadrature," which refers to a phase difference of 90 degrees. If the angles of the first arm 22a and second arm 22b are denoted, respectively, by $\theta_1$ and $\theta_2$, then their relationship in opposition implies that $\theta_1 = -\theta_2$. Likewise, if the angles of the sails 28a and 28b are denoted, respectively, by $\alpha_1$ and $\alpha_2$, then opposition implies that $\alpha_1 = -\alpha_2$.

If the base 18 of FIG. 1 were pivotally mounted atop the column 14, so as to permit the apparatus to pivot about the axis 16, it would be found that the aerodynamic forces would tend to cause the base 18 to pivot about the axis 16 due to the opposition of the load. This effect is overcome by the embodiment of FIG. 2, by requiring the sails in each pair to move in opposition. The reaction forces cancel. In the preferred embodiment of FIG. 2, the bases 18a and 18b are pivotally mounted on the columns 14a and 14b respectively for rotation about the axes 16a and 16b respectively. The structure mounted atop the column 14a acts as a weathervane, pivoting as the wind changes direction so that the base 18a is maintained perpendicular to the wind direction, indicated by the arrow 74. Likewise, the structure atop the column 14b acts as a weathervane, pivoting to maintain the base 18b perpendicular to the local wind direction, which could conceivable be different from the local wind direction at column 14a.

Thus, the present inventor found that by the simple expedient of requiring the sails 28a and 28b to move in opposition and the sails 28c and 28d to move in opposition, the entire system can be made to be wind-seeking.

The system of FIG. 2 embodies a further advantageous principle. As shown, the motion of the sails 28a and 28b is at quadrature with respect to the motion of the sails 28c and 28d. As shown in FIG. 2, the arms 22a and 22b are at the midpoints of their excursions and the sails 28a and 28b are at their maximum angle of tilt with respect to the wind. In deliberate contrast, at the same instant, the arms 22c and 22d are at the extremeties of their excursions, and the sails 28c and 28d are momentarily parallel to the local wind. As will be seen below, the present inventor has selected this quadrature mode of operation to eliminate the possibility that the system will come to rest at a top-dead-center. In the preferred embodiment of FIG. 2, as one pair of sails (28c and 28d) are finishing their power strokes, the other pair of sails (28a and 28b) are in the middle of their strokes.

Figure 4:
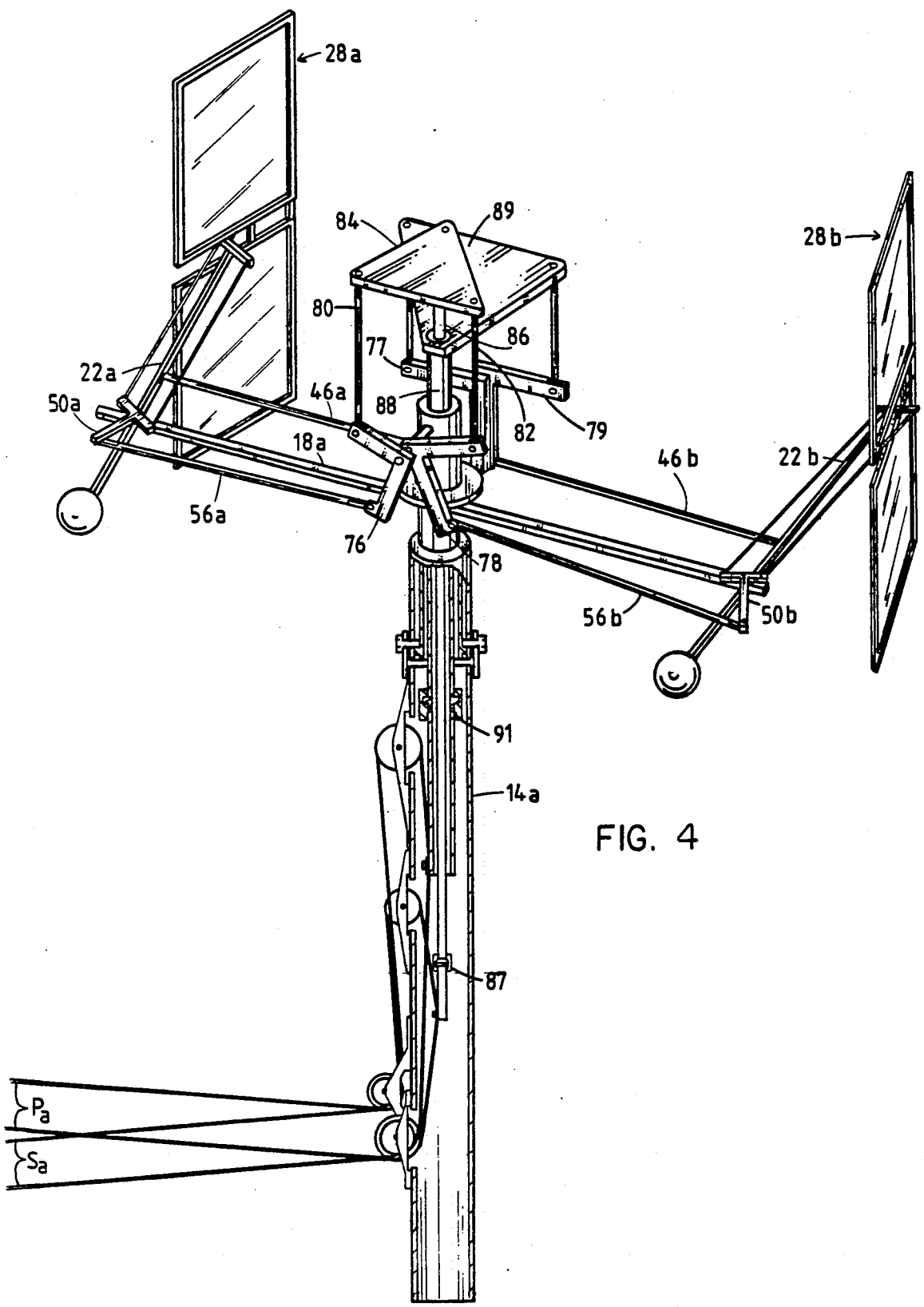
FIG. 4 is a perspective view showing two sails mounted on a single column for opposed motion.
Figure 5:
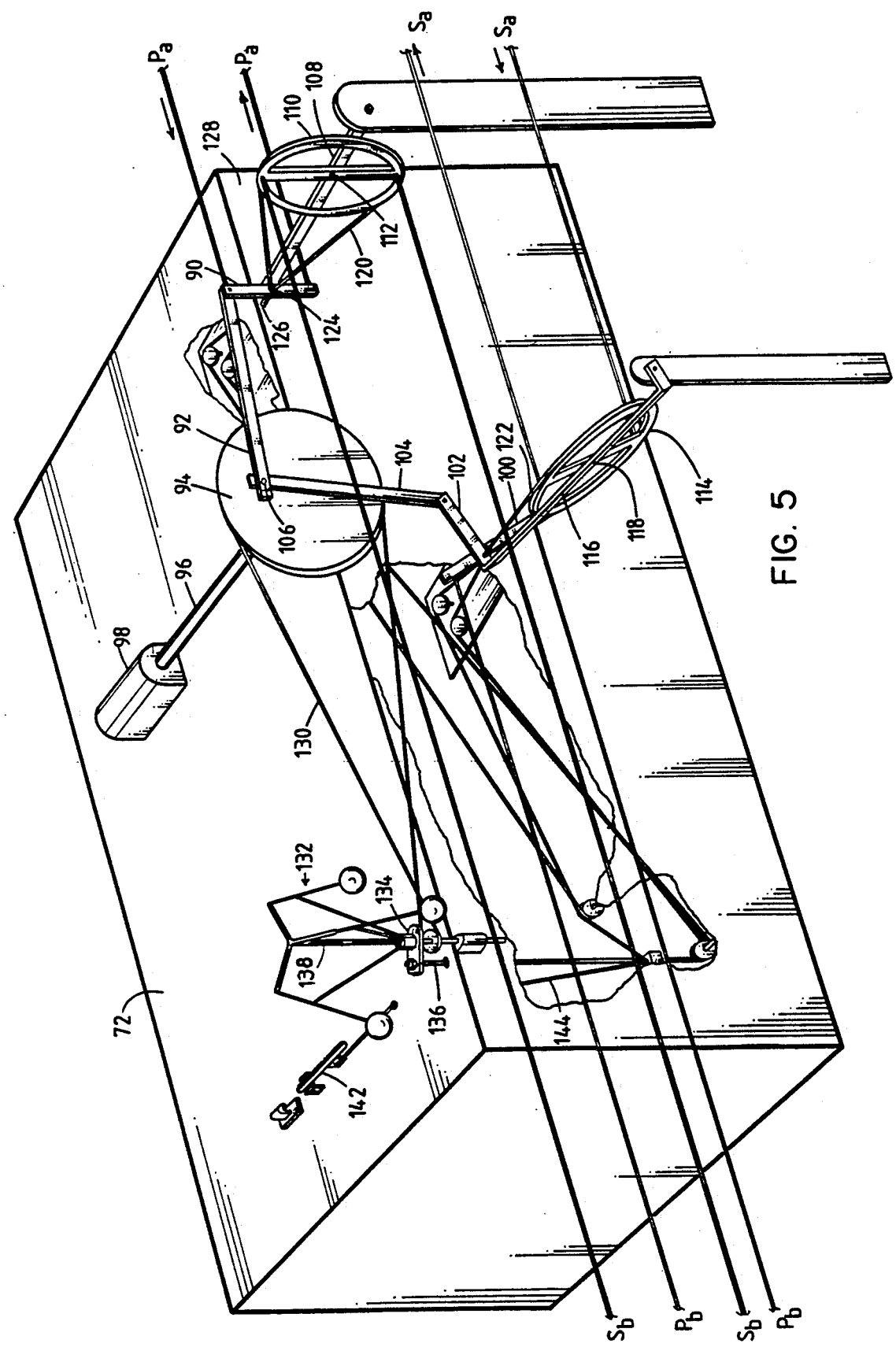
FIG. 5 is a diagrammatic perspective view showing a central station at which forces generated at two masts are applied to turn a wheel; and, FIG. 6 is a diagram showing the apparatus of FIG. 1 in a top plan view and showing how certain angles are defined with respect thereto.

FIGS. 4 and 5 show in greater detail the structure of the various components of FIG. 2.

FIG. 3 is a diagram illustrating how the sail assemblies 28c and 28d of FIG. 2 move. The numbers at the top of the diagram identify successive times, and the interval between successive positions corresponds to 20 degrees of the 180 degrees that makes up a half cycle of motion of the output shaft as it is driven by the movement of the arms 22c and 22d. Note that position 1 and position 10 are 180 degrees apart in phase, and that only in position 1 and 10 are the sail assemblies aligned with the wind direction arrow 74, and the maximum angle of the sail assemblies with respect to the wind direction occurs between positions 5 and 6, when the arms 22c and 22d are aligned parallel to the wind direction.

As will be seen below, no mechanical stops limit the motion of the arms 22c and 22d or the motion of arms 22a and 22b. Instead, the angle of attack of the sail assemblies is programmed in such a way that, neglecting inertia, the sail assemblies 28c, 28d exert no lateral forces on the arms 22c and 22d when the sail assemblies are their positions 1 and 10, since their angle of attack is zero in those positions.

FIG. 4 shows the structure of the right-hand portion of FIG. 2 in greater detail; it is typical of the left-hand portion of FIG. 2. The base 18a is pivotally attached to the top of the column 14a, and the visible parts atop the column 14a pivot with the base 18a to permit the assembly to be wind-seeking.

Two cables, both labelled $S_a$ are visible at the bottom of FIG. 4. As one of these cables moves, under control of the apparatus of FIG. 5, the other cable moves an equal amount in the opposite direction, thereby raising or lowering the inner pipe 86. The pulleys and the column 14a do not rotate, but the plate 84 does pivot with the arm 18a. It is necessary to decouple the pivotal motion. One way of doing this is by use of the coupling 87 which transmits upward and downward movements but which does not transmit the pivotal motion. Vertical motion of the pipe 86 causes vertical movement of the plate 84 and the rods 80, 82.

The L-shaped rocker arms 76, 78 convert the vertical motion of the rods 80, 82 to lateral motion of the connecting rods 56a, 56b, respectively. As described above, the direction of the sail with respect to the base 18a is controlled by the arms 50a, 50b to which the connecting rods 56a, 56b are connected. Thus, the direction of the sails is controlled by relative movements of the cables $S_a$. As will be seen in connection with FIG. 5, the cables $S_a$ are coupled to the cables $P_b$ that transmit power from the structure at the left hand of FIG. 2 to the central station 72 of FIG. 2.

Likewise, the aerodynamic force on the sails 28a, 28b is brought to bear on the arms 22a, 22b and that force is transmitted by the connecting rods 46a, 46b to a pair of rocker arms 77, 79 that raise and lower the plate 89 to exert upward and downward forces on the pipe 88. Pivotal motion of the plate 89 must be decoupled from the lower portion of the pipe 88, and this is accomplished by the coupling 91, which transmits upward and downward motions but does not transmit pivotal motion. The upward and downward motions of the lower end of the pipe 88 are converted to corresponding movements of the cables Pa, which move by equal amounts but in opposite directions. These cables Pa transmit the power inherent in the forceable movement of the sails by the wind to the central station 72. In contrast, the cables $S_a$ transmit information from the central station 72 regarding the sail angles α. Accordingly, the cables $S_a$ do not have to be as strong as the cables $P_a$. As will be seen in connection with FIG. 5, the cables $P_a$ are coupled to the cables $S_b$ that go to the structure at the left-hand side of FIG. 2. It is this cross-coupling between the two pairs of sails that causes the left-hand pair to operate at quadrature to the right-hand pair, thereby to prevent the apparatus from stalling at a top-dead-center condition. Referring to FIG. 2, the first arm 22a and the third arm 22c move in quadrature, and the second arm 22b and the fourth arm 22d move in quadrature, as required by the cable connections shown in FIG. 5 and described below.

The central station 72 is shown in greater detail in FIG. 5. The diagram of FIG. 5 illustrates detail several important aspects of the present invention.

The flow of power is relatively simple. The cables $P_a$ from the conduit 70a are shown in the upper right-hand portion of FIG. 5. They are attached to opposite ends of the rocker arm 90, which pivots about its mid-point. The rocker arm 90 applies power to the wheel 94 through the connecting rod 92. The wheel 94 is connected to the shaft 96, which turns the generator 98.

The power cables $P_b$ from the conduit 70b of FIG. 2 enter the central station of FIG. 5 from the lower left portion and are connected to opposite ends of the rocker arm 100. The arm 102 is a unitary part of the rocker arm 100 and pivots with it. The arm 102 is pivotally connected to the connecting rod 104, which, in turn is connected to the wheel 94 by the same pin 106 that connects the connecting rod 92 to the wheel 94.

As noted in connection with FIG. 2, the arms 22a and 22b are shown as being at the center of their strokes, and this corresponds to the pin 106 being at the center of its horizontal range of movement. Further, in FIG. 2 the arms 22c and 22d were shown as being momentarily at the extremeties of their motions, and this corresponds to the point 106 being at its extreme vertical position.

It is thus seen that the right-hand pair of sails 28a, 28b of FIG. 2 are at quadrature with the left-hand pair of sails 28c, 28d. As a result, in FIG. 5 the connecting rod 104 is at top-dead-center position, but there is no possibility of the machine stalling, because the connecting rod 92 is supplying maximum power at that instant. It is an important feature of the preferred embodiment that it can never stall in a top-dead-center condition.

Another important feature will now be described. In FIG. 5 it will be noted that the shaft 108 is rigidly connected to the rocker arm 90 and pivots with it. The wheel 110 is pivotally mounted to the shaft 108 by the pin 112. Thus, not only can the wheel 110 rotate about the pin 112, but it is continually tipping in unison with the rocker arm 90. Likewise, the wheel 114 is connected to the shaft 116 by the pin 118, so that the wheel 114 can rotate about the pin 118 while at the same time it is tipping in unison with the rocker arm 100.

Note that the cables $S_b$ are connected to the wheel 110 at points equidistant from the pin 112, and that the cables $S_a$ are connected to the wheel 114 at points equidistant from the pin 118. As discussed above, the cables $P_a$, in addition to transmitting forces, also transmit information regarding the position of the arms 22a, 22b of FIG. 2. Likewise, the cables $P_b$ transmit information regarding the position of the arms 22c, 22d. Thus, in comparing FIGS. 2 and 5 it is seen that the angle of the sail assemblies 28c, 28d is determined by the position angle of the arms 22a, 22b; and likewise, the angle $\alpha$ of the sail assemblies 28a, 28b, as set by the cables $S_a$ are determined by the angular position of the arms 22c, 22d, as transmitted by the cables $P_b$. This relationship can be restated as follows: The angle $\alpha_1$, of a first sail is made to be proportional to the angle $\theta_2$ of the arm of a second sail. In symbols this may be written as:

$$\alpha_1 = \kappa_2 \theta_2$$

$$\alpha_2 = \kappa_1 \theta_1$$

where $\kappa_1$ and $\kappa_2$ are constants of proportionality, which may also be called coupling coefficients. In succeeding paragraphs, it will be shown that the coupling coefficients can be altered automatically or manually to keep the wheel 94 turning at a constant speed as the windspeed increases.

In FIG. 5 it is seen that as the wheel 110 is rotated through 90 degrees about the pin 112, the amplitude of the motion of the cables $S_b$ smoothly diminishes until, when the wheel 110 has been rotated through 90 degrees, the cables $S_b$ do not move at all, even though the motion of the cables $P_a$ is undiminished. In this manner, the coupling coefficient $\kappa_1$ can be altered at will and even made equal to zero. Likewise, as the wheel 114 is rotated through 90 degrees about the pin 118, the motion of the cables $S_a$ gradually diminishes, even though the motion of the cables $P_b$ is not diminished. Also, when the wheel 114 has been rotated through 90 degrees from the position shown in FIG. 5, the relative motion of the cables $S_a$ becomes zero. In this way, the coupling coefficient $\kappa_2$ can be altered at will. As shown in FIG. 5, a cable 120 passes circumferentially around the wheel 110 and is used for rotating the wheel 110 about the pin 112. Likewise, the cable 122 passes around the circumference of the wheel 114 and is used for rotating the wheel 114 about the pin 118.

The cable 120 enters the housing 128 through a bore 124 in the axle 126. Likewise, the cable 122 enters the housing 128 through a similar bore in the axle on which the rocker arm 100 is mounted.

If a high windspeed is anticipated, it is possible to reduce the angle of attack of all the sail assemblies to zero by rotating the wheels 110 and 114 90 degrees from the position shown in FIG. 5. This rotation of the wheels is accomplished by moving the cables 120, 122 manually. In this condition, the sail assemblies act as weather vanes, simply rotating about the columns 14a, 14b in response to the wind direction.

In addition to being used for feathering the sail assemblies in anticipation of strong winds, rotation of the wheels 110, 114 through angles less than 90 degrees can be used for keeping the wheel 94 turning at constant speed regardless of variations in the windspeed. To this end, a belt or cable 130 passes around the circumference of the wheel 94 and is used to drive a governor 132. The governor 132, as is well known, includes a bushing 134 that is drawn upwardly on the shaft 138 in relation to the speed of rotation of the shaft. The bushing 134 is connected to a rod 136 that is connected to the cables 120, 122, so that as the rod 136 moves in response to changes in the speed of the wheel 94, the cables 120, 122 will be pulled so as to rotate the wheels 110, 114 in response to the speed of the wheel 94. As the wheel 94 turns ever faster, the bushing 134 is drawn higher on the axle 138, drawing the rod 136 upwardly. The upward movement of the rod 136 pulls on the cables 120, 122 thereby rotating the wheels 110, 114 from the position shown in FIG. 5. This rotation of the wheels 110, 114 diminishes the coupling coefficients, thereby reducing the angles of the sail assemblies 28a through 28d. The reduction in the angles of the sail assemblies causes a reduction in the aerodynamic force on the sail, with a concomitant reduction in the speed of the arms 22a through 22d. This speed reduction is directly reflected in a reduction in the speed of the wheel 94.

So long as the cables 120, 122 are connected to each other as shown in FIG. 5, the coupling coefficients $K_1$ and $K_2$ are maintained equal and may be denoted by K. If, for purposes of exposition, the four sails 28a, 28b, 28c and 28d of FIG. 2 are identified as sails 1, 2, 3 and 4, respectively, and if the four arms 22a, 22b, 22c and 22d of FIG. 2 are identified as arms 1, 2, 3 and 4, respectively, then $$\alpha_3 = -\alpha_4 = \kappa \theta_1 = -\kappa \theta_2$$

and $$\alpha_1 = -\alpha_2 = \kappa \theta_3 = -\kappa \theta_4$$

where K is the coupling coefficient, which is independent of the instantaneous values $\alpha_1$, $\alpha_2$, $\theta_1$ and $\theta_2$.

As seen in FIG. 5, a lever 142 is connected by the cable 144 to the cables 120, 122, to permit direct manual intervention by the operator. This is particularly useful during start-up and shut-down of the wind motor.

Thus, there has been described a preferred embodiment of a wind motor that includes a number of novel features. It is recognized that in a machine as complicated as this, numerous functionally equivalent variations are conceivable, and such variations are considered to be within the scope and spirit of the present invention.

In accordance with the present invention, a sail assembly is pivotally mounted to an arm for motion about a first axis with respect to the arm. The arm is pivotally mounted to a base for pivotal motion with respect to the base about a second axis that is parallel to the first axis. A parallelogram linkage is provided for turning the sail assembly about the first axis. The centers of a pair of opposite sides of the parallelogram are located on the first and second axis. This arrangement permits the angle of the sail assembly with respect to the base to be altered independently of the angle of the arm with respect to the base. This, in turn, permits the angle of the sail assembly with respect to the base to be varied in some deliberate way, and the resulting aerodynamic forces on the sail assembly will cause the arm to swing in response.

In a preferred embodiment of the invention, the angle of the sail assembly with respect to the base is constrained to vary in quadrature with respect to the angle of the arm with respect to the base. This quadrature connection will then result in the arm oscillating back and forth with respect to the base in an undulating motion.

In the preferred embodiment, a pair of sail assemblies are mounted on separate arms from the same base. These sail assemblies are coupled so that they move in opposition to each other. This renders the net torque exerted on the base equal to zero and permits the assembly to be wind-seeking. In the preferred embodiment, two such pairs of sails are connected in quadrature to a drive shaft to prevent the machine from coming to rest at a top-dead-center condition.

In accordance with the preferred embodiment of the invention, the coupling coefficient between the angle of the sail assembly with respect to the base and the angle of the arm to which it is coupled with respect to the base can be altered at will. This permits the sail assemblies to be feathered to withstand strong winds, and also permits the speed of rotation of the output shaft of the machine to be controlled by a governor so as to be independent of the windspeed.

Industrial Applicability

The wind motor of the present invention can be used to convert the power of the wind into reciprocating motion of a rod, rotary motion of a shaft, or into electrical power. Traditional uses for wind motors include pumping water from wells for irrigation, charging storage batteries, and grinding grain. The present invention is not limited to these traditional uses, and should find widespread application wherever an economical source of mechanical or electrical power is needed. The low-speed winds in which the present invention is designed to operate are more widely available than are the high-speed winds required by certain wind motors of the prior art.

I claim:

1. Apparatus for use in a wind motor, comprising in combination:
    a base;
    an arm oriented at an angle $\theta$ with respect to said base;
    means for mounting said arm to said base for pivotal motion with respect to said base about a first axis that is perpendicular to said arm;
    a sail having a center of pressure and oriented at an angle $\alpha$ with respect to said base;
    means for mounting said sail to said arm for pivotal motion with respect to said arm about a second axis parallel to but displaced from the first axis, said second axis passing through the center of pressure of said sail; and
    coupling means interconnected between said base and said sail for producing a reciprocating motion of said arm with respect to said base by continuously altering the angle $\alpha$ of said sail with respect to said base.

2. The apparatus of claim 1 wherein said coupling means alters the angle $\alpha$ of said sail with respect to said base in relation to the changing angle $\theta$ of said arm with respect to said base.

3. The apparatus of claim 2 wherein said coupling means relates to $\alpha$ and $\theta$ in approximate accordance with the equation $$\left(\frac{\alpha}{\alpha_{MAX}}\right)^2 + \left(\frac{\theta}{\theta_{MAX}}\right)^2 = 1$$

where $\alpha_{max}$ is the greatest value of $\alpha$ and $\theta_{max}$ is the greatest value of $\theta$.

4. The apparatus of claim 1 further comprising:
    an output shaft mounted to said base for rotation; and,
    means connecting said arm to said output shaft for converting reciprocating motion of said arm with respect to said base to rotational motion of said output shaft.

5. The apparatus of claim 1 wherein said coupling means further includes a crankshaft mounted for rotation upon said base.

6. The apparatus of claim 1 wherein said coupling means further include a linkage having a first arm affixed to said sail and extending perpendicular to said sail with the midpoint of said first arm lying on said second axis, and having a second arm opposite said first arm, pivotally mounted to said base with the midpoint of said second arm lying on said first axis.

7. Apparatus for use in a wind motor, comprising in combination:
    a base;
    a first arm;
    a second arm;
    means for mounting said first arm to said base for reciprocating pivotal motion about a central position about a first arm axis that is perpendicular to said first arm;
    means for mounting said second arm to said base for reciprocating pivotal motion about a central position about a second arm axis that is perpendicular to said second arm, the central position of said second arm being parallel to the central position of said first arm but displaced from it;
    a first sail having a center of pressure;
    a second sail having a center of pressure;
    means for mounting said first sail to said first arm for pivotal motion with respect to said first arm about a first sail axis parallel to but displaced from the first arm axis, said first sail axis passing through the center of pressure of said first sail;
    means for mounting said second sail to said second arm for pivotal motion with respect to said second arm about a second sail axis parallel to but displaced from the second arm axis, said second sail axis passing through the center of pressure of said second sail; and, coupling means interconnecting said first arm and said second arm in such a way that said first arm and said second arm move in opposition, whereby $\theta_1 = -\theta_2$ and interconnecting said first sail and said second sail in such a way that said first sail and said second sail turn in opposition, whereby $\alpha_1 = -\alpha_2$, where $\theta_1$ and $\theta_2$ are the angles of said first arm and said second arm, respectively, with respect to said base and where $\alpha_1$ and $\alpha_2$ are the angles of said first sail and said second sail, respectively, with respect to said base.

8. The apparatus of claim 7 further comprising in combination:

a foundation affixed to the earth; and, means connected to said foundation for pivotably mounting said base on said foundation for rotational motion about a vertical axis, the center of pressure of the combination of said base and the elements mounted on it displaced downwind from the vertical axis, whereby said base in wind-seeking.

9. Apparatus for use in a wind motor, comprising in combination:

a first base;

a first arm pivotally mounted to said first base for reciprocating pivotal motion about a central position about a first arm axis that is perpendicular to said first arm;

a second arm pivotally mounted to said first base for reciprocating pivotal motion about a central position about a second arm axis that is perpendicular to said second arm, the central position of said second arm being parallel to the central position of said first arm but displaced from it;

a first sail having a center of pressure and mounted to said first arm for pivotal motion with respect to said first arm about a first sail axis parallel to but displaced from the first arm axis, said first sail axis passing through the center of pressure of said first sail;

a second sail having a center of pressure and mounted to said second arm for pivotal motion with respect to said second arm about a second sail axis parallel to but displaced from the second arm axis, said second sail axis passing through the center of pressure of said second sail;

a second base displaced from said first base;

a third arm pivotally mounted to said second base for reciprocating pivotal motion about a central position about a third arm axis that is perpendicular to said third arm;

a fourth arm pivotally mounted to said second base for reciprocating pivotal motion about a central position about a fourth arm axis that is perpendicular to said fourth arm, the central position of said fourth arm being parallel to the central position of said third arm but displaced from it;

a third sail having a center of pressure and mounted to said third arm for pivotal motion with respect to said third arm about a third sail axis parallel to but displaced from the third arm axis, said third sail axis passing through the center of pressure of said third sail;

a fourth sail having a center of pressure and mounted to said fourth arm for pivotal motion with respect to said fourth arm about a fourth sail axis parallel to but displaced from the fourth arm axis, said fourth sail axis passing through the center of pressure of said fourth sail;

coupling means interconnecting said first arm and said third arm in such a way that said first arm and said third arm move in quadrature, and interconnecting said second arm and said fourth arm in such a way that said second arm and said fourth arm move in quadrature.

10. The apparatus of claim 9 wherein $\theta$ denotes the angle of arm i with respect to its base and $\alpha_i$ denotes the angle of sail i with respect to its base, and wherein said coupling means further interconnects said first and second arms with said third and fourth sails and interconnects said third and fourth arms with said first and second sails in approximate accordance with the equations $$\alpha_3 = -\alpha_4 = \kappa\theta_1 = -\kappa\theta_2$$

and $$\alpha_1 = -\alpha_2 = \kappa\theta_3 = -\kappa\theta_4$$

where $\kappa$ is a coupling coefficient that is independent of the instantaneous values of $\alpha_1$, $\alpha_2$, $\theta_1$ and $\theta_2$.

11. The apparatus of claim 10 further comprising in combination control means connected to said coupling means for altering the coupling between said first and second arms and said third and fourth sails and between said third and fourth arms and said first and second sails, thereby altering the coupling coefficient $\kappa$.

12. The apparatus of claim 11 wherein said control means further comprise governor means for altering the coupling coefficient in relation to the frequency of the reciprocating pivotal motion of the arms.

13. The apparatus of claim 11 wherein said control means further comprise manual intervention means for use by an operator in altering the coupling coefficient $\kappa$.

* * * * *